# 3,004,001
ODOR INHIBITORS FOR POLYOLEFINS

Archie L. Robbins and Kenneth R. Mills, Bartlesville, Okla., assignors to Phillips Petroleum Company, a corporation of Delaware
No Drawing. Filed Aug. 28, 1959, Ser. No. 836,589
10 Claims. (Cl. 260—45.95)

This invention relates to odor inhibitors for use in conjunction with olefin polymers. In one aspect, it relates to the use of alpha-hydroxy ketones as odor inhibitors for antioxidant-containing polymers.

Various methods are described in the literature for producing high density, highly crystalline polymers of olefins, such as polyethylene, polypropylene, ethylene-propylene copolymers, and the like. These polymers are employed in a variety of applications, including the fabrication of molded articles of many kinds, pipe, sheeting, film, fiber, and the like. One recently discovered process for the production of these polymers involves the polymerization of an olefin in the presence of a chromium oxide-containing catalyst. In order to prevent degradation of the polymer, it is the usual practice to incorporate therein a minor amount, generally less than 1 percent, of an antioxidant, such as a compound of the bisphenol type, certain substituted phenols, or a phenylene diamine. When fabricating articles from olefin polymers prepared over a chromium oxide-containing catalyst and containing an antioxidant, it has been found that at elevated temperatures, such as are incurred in injection molding procedures, e.g., between about 350 and 600° F., objectionable odors may be developed. This condition is most frequently observed when appreciable amounts of catalyst are present in the polymer which is undergoing fabrication. However, it has also been found that there is no odor problem if an antioxidant is not present even though the polymer contains an appreciable amount of catalyst.

It is an object of this invention to provide an odor inhibitor for use in a polymer containing an antioxidant and prepared in the presence of a chromium oxide-containing catalyst.

Another object of the invention is to provide a method for preventing the development of odor at elevated temperatures in hydrocarbon polymers prepared in the presence of a chromium oxide-containing catalyst.

A further object of the invention is to provide an olefin polymer containing an odor-producing antioxidant and an odor inhibitor.

Other and further objects and advantages of the invention will become apparent to those skilled in the art upon consideration of the accompanying disclosure.

The instant invention resides in the discovery of an odor inhibitor for use with antioxidant-containing olefin polymers which have been prepared in the presence of a chromium oxide-containing catalyst. Thus, it has been found that the development of odor in such polymers, which may occur particularly at elevated temperatures, can be eliminated or substantially reduced by incorporating in the polymer in the range of 0.01 to 2.0 weight percent, based on the amount of the polymer, of an alpha-hydroxy ketone corresponding to the general formula RCHOHCOR', wherein R and R' are selected from the group consisting of alkyl, aryl, cycloalkyl, aralkyl and alkaryl radicals. The total number of carbon atoms in the R and R' groups does not exceed 18. It is to be understood that the R and R' groups of the aforementioned general formula may be the same or different.

As mentioned above, the process of this invention is applicable to the prevention of odor development in olefin polymers prepared in the presence of a chromium oxide-containing catalyst. A method for preparing such polymers is described in detail in U.S. Patent 2,825,721, issued to J. P. Hogan and R. L. Banks. As disclosed in this patent, unique polymers and copolymers can be produced by contacting one or more olefins with a catalyst comprising as an essential ingredient chromium oxide, preferably including a substantial amount of hexavalent chromium. The chromium oxide is ordinarily associated with at least one other oxide, particularly at least one oxide selected from the group consisting of silica, alumina, zirconia and thoria. The olefin feed used for the polymerization is at least one olefin, particularly an aliphatic 1-olefin, selected from a class of olefins having a maximum of 8 carbon atoms per molecule and no branching nearer the double bond than the 4-position. Examples of olefins which can be polymerized by the described method include ethylene, propylene, 1-butene, 1-pentene, and 1,3-butadiene. Copolymers, such as ethylene-propylene copolymers and ethylene-butadiene copolymers, can also be prepared by utilizing the chromium oxide-containing catalyst. In copending U.S. patent application Serial No. 590,567, filed by G. T. Leatherman and C. V. Detter on June 11, 1956, there is described an improvement in the process disclosed in the Hogan and Banks patent insofar as the production of ethylene polymers is concerned. The present invention is particularly applicable to polymers prepared in accordance with the Leatherman and Detter process.

As described in detail in the Leatherman and Detter application, ethylene or mixtures of ethylene with other unsaturated hydrocarbons are contacted with a suspension of a chromium oxide-containing catalyst in a liquid hydrocarbon diluent. The contacting occurs at a temperature such that substantially all of the polymer produced is insoluble in the diluent and in solid particle form, the particles being substantially non-tacky and non-agglutinative, and suspended in the liquid diluent. The liquid hydrocarbon diluent serves as an inert dispersant and heat transfer medium in the practice of the process. While the liquid hydrocarbon is a solvent for the ethylene feed, the polymer at the temperature at which the polymerization is carried out is insoluble in the liquid hydrocarbon. Liquid hydrocarbons which can be used are those which are liquid and chemically inert under the reaction conditions. Paraffins, such as those having from 3 to 12, preferably from 3 to 8, carbon atoms per molecule, can be advantageously utilized in the practice of the invention. Examples of paraffins which can be employed include propane, n-butane, n-pentane, isopentane, n-hexane, n-decane, 2,2,4-trimethylpentane (isooctane), and the like. Another class of hydrocarbons which can be used is naphthenic hydrocarbons having from 4 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the propyl cyclohexanes, and the ethyl propyl cyclohexanes. A preferred subclass of naphthenic hydrocarbons within the described general class is constituted by those naphthenic hydrocarbons having from 5 to 6 carbons atoms in a single ring and from 0 to 2 methyl groups as the only substituent on the ring. Thus, the preferred naphthenic hydrocarbons are cyclopentane, cyclohexane, methylcyclopentane, methylcyclohexane, the dimethylcyclopentanes, and the dimethylcyclohexanes. It is also disclosed by Leatherman and Detter that mixtures of paraffinic and naphthenic hydrocarbons can serve as the reaction medium.

When utilizing butane and higher paraffinic hydrocarbons as the reaction medium, the polymerization temperature of the Leatherman and Detter process is generally in the range of about 230° F. and below, preferably 225° F. and below. Propane having a critical temperature of about 206° F. is useful in the range in which it can be maintained in the liquid phase. The temperature range for naphthenic hydrocarbons is about 190° F. and below, preferably about 180° F. and below. If mixtures of paraffinic and naphthenic hydrocarbons are employed, the upper temperature limit will be between 190 and 230° F., depending upon the composition of the mixture.

The catalyst employed in the Leatherman and Detter process is similar to that used in the Hogan and Banks process as described in the above-cited patent. Thus, the catalyst comprises, as an essential ingredient, chromium oxide, preferably including a substantial amount of hexavalent chromium, the chromium oxide being ordinarily associated with at least one oxide selected from the group consisting of silica, alumina, zirconia and thoria. The chromium oxide content of the catalyst can range from 0.1 to 10 or more weight percent, e.g., up to about 50 percent or higher, usually 50 percent or less, but the preferred range is from 2 to 6 weight percent, expressed as elemental chromium. A preferred non-chromium component is a silica-alumina composite containing a major proportion of silica and a minor proportion of alumina. While the method of preparing the silica-alumina composite undoubtedly affects to some extent the catalyst activity, it appears that composites prepared by any of the prior art processes for preparing such catalytically active composites, e.g., coprecipitation or impregnation, are operative for the process of the Leatherman and Detter invention. Methods for the preparation and activation of this catalyst are described in detail in the Hogan and Banks patent referred to hereinabove. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chrimium oxide. Examples of such compounds are chromium trioxide, chromium nitrate, chromium acetate, and ammonium chromate. The composite resulting from the impregnation step is dried and then contacted for a period of several hours at a temperature of from 450 to 1500° F., preferably from about 900 to 1000° F., under non-reducing conditions, for example, with a stream of substantially anhydrous (dew point preferably 0° F. or lower) oxygen-containing gas such as air. A commerial microspheroidal silica-alumina composite can also be advantageously used in the preparation of the catalyst.

The catalyst is preferably employed in the form of a relatively fine powder so that it may be readily maintained in suspension or as a slurry in the liquid hydrocarbon. The catalyst powder generally has a particle size of 100 mesh and smaller, preferably 100 microns and smaller. Although the catalyst size is not critical, it should be small enough so that it can be readily maintained as a slurry in the liquid hydrocarbon. The concentration of the catalyst in the reaction zone can vary within wide limits. However, the concentration of the catalyst in the reaction zone will usually be in the range of 0.01 to 5 weight percent, preferably 0.01 to 0.1 weight percent, based on the total amount of the reaction medium, i.e., liquid hydrocarbon diluent, present in the reaction zone. While there are no critical residence or contact times for practicing the process, the contact time would generally be in the range of 0.1 to 12 hours, preferably from 1 to 5 hours.

When preparing ethylene polymers according to the Leatherman and Detter process, very high yields, in terms of pounds of polymer product per pound of catalyst can be obtained. As a result, the polymer product contains only a comparatively small amount of catalyst, rendering unnecessary in the case of many applications to treat the product so as to remove the catalyst. However, the amount of catalyst remaining in the polymer may still be quite large as compared to a polymer which has been subjected to special treatment to remove catalyst residues. Because of the presence of these comparatively large amounts of catalyst in the polymer product obtained in the Leatherman and Detter process, it has been observed that there is a greater tendency for odor to develop with such polymers when the polymers containing an odor-producing antioxidant are worked at elevated temperatures. As a result, the present invention is particularly applicable to ethylene polymers prepared in accordance with the Leatherman and Detter process.

The odor inhibitors of this invention can be broadly defined as alpha-hydroxy ketones. Examples of such compounds include benzoin, acetoin, phenylhydroxymethyl methyl ketone, 1-hydroxyethyl phenyl ketone, 1-hydroxyundecyl methyl ketone, 1-hydroxyamyl amyl ketone, p-tolylhydroxymethyl phenyl ketone, cyclohexylhydroxymethyl phenyl ketone, benzylhydroxymethyl methyl ketone, phenylhydroxymethyl cyclohexyl ketone, and phenylhydroxymethyl p-tolyl ketone.

The polymers to which the odor inhibitors of this invention are added include an antioxidant suitable for protecting hydrocarbon polymers against degradation and containing in its structure a phenyl radical in which at least one of its valences is satisfied by either an amino or a hydroxy group. The antioxidants are free of carboxyl groups and usually have a molecular weight of at least 110. These compounds are commonly known as phenols, bisphenols and aromatic amines. Examples of such odor-producing antioxidants include 4,4'-thiobis(6-tert-butyl-m-cresol), 2,6-di-tert-butyl-4-methylphenol, 4,4'-thiobis(6 - tert - butyl - o - cresol), di - beta - naphthyl-p - phenylenediamine, p,p' - dioctyldiphenylene - diamine, 4,4' - thiobis(6 - isopropyl - m - cresol), 4,4' - thiobis(3 - pentadecyl - 5 - tert - butyl phenol), 4,4' - thiobis(3 - ethyl - 2 - hexylphenol), 4,4' - thiobis(3 - methyl - 6 - benzylphenol), 4,4' - thiobis(3,6 - diethylphenol), and the like; 4,4'-butylidene bis(6-tert-butyl-m-cresol), 4,4' - propylidene bis(5 - tert - amyl - m - cresol), 4,4'-methylene bis(3,6-dimethylphenol), and the like; 2,5-di - tert - amylhydroquinone; 2,6 - di - tert - butylhydroquinone, hydroquinone, and the like; 2,6-di-tetrt-butyl-5-methylphenol, 2,4,6-tri-tert-butylphenol, 2-methyl-4-ethyl-6-isopropylphenol, and the like; and N,N'-diphenyl-p - phenylenediamine, N,N' - di - tert - butyl - p - phenylenediamine, N-phenyl-N'-cyclohexyl-o-phenylenediamine, and the like. From the viewpoint of odor development, it is usually preferred to use as antioxidants compounds of the thio-bis-phenol type, e.g., 4,4'-thiobis(6-tert-butyl-m-cresol). However, in the absence of the alpha-hydroxy ketones of the present invention, polymers containing these preferred compounds are still subject to the odor problem if there is present in the polymer more than about 0.001 percent ash. The antioxidants are generally added in amounts between about 0.001 and 1.0 weight percent of the polymer.

The alpha-hydroxy ketones of this invention can be incorporated in the polymer by any suitable method, such as on a roll mill or by solution blending. In another suitable method, the odor inhibitor is dissolved in a volatile solvent, such as acetone, and the resulting solution is dry blended with the polymer prior to its being pelletized. In the case of the polymers produced by the Leatherman and Detter process, the odor inhibitors can be advantageously incorporated by dry blending with the polymer as it is recovered from the process.

A more comprehensive understanding of the invention can be obtained by referring to the following illustrative example, which is not intended, however, to be unduly limitative of the invention.

*Example*

The polymer used in this example was a portion taken from a blend of polyethylenes which had been prepared in the presence of chromia-silica-alumina catalysts at a temperature between 200 and 225° F. and at a pressure between 300 and 450 p.s.i.g., using n-pentane as the diluent. This polymer had an ash content of 0.08 weight percent and had incorporated therein 0.05 weight percent Santonox (4,4'-thiobis(6-tert-butyl-m-cresol)). This ethylene polymer in particulate form as recovered from the drier and containing antioxidant was admixed with 0.1 weight percent benzoin, the latter material being sprayed on the polymer in acetone solution. The acetone vaporized from the mixture, leaving the benzoin on the surface of the polymer. A portion of this treated polymer was heated in an injection molding machine at 500° F. for 12 minutes after which it was injection molded into bars. Control bars were made in the same manner from the antioxidant-containing polymer to which benzoin had not been added. The bars were maintained in closed containers for several hours after which they were evaluated relative to odor and color by a panel of 10 individuals. The evaluations of these individuals were made on a scale of 1 to 5, with 1 being best and 5 being poorest. The average of these ratings was recorded as the comparative odor. It is to be understood that the evaluations were qualitative and purely comparative. The results of the evaluations are shown hereinbelow.

| Additive | Average of 10 | |
|---|---|---|
| | Odor | Color |
| 0.1% Benzoin | 2.4 | 1.0 |
| None | 5.0 | 3.8 |

From the foregoing, it is seen that the addition of benzoin to the polyethylene containing antioxidant resulted in a substantial reduction of the odor. Furthermore, it is seen that the color of the polymer containing the odor inhibitor was superior to the control which did not include this material.

It will be apparent to those skilled in the art that variations and modifications can be made in the light of the foregoing disclosure. Such variations and modifications are believed to be clearly within the spirit and scope of the invention.

We claim:

1. A polymer composition comprising a blend of (1) a polymer of an aliphatic 1-olefin having a maximum of 8 carbon atoms per molecule and no branching nearer the double bond than the 4-position, said polymer having been prepared in the presence of a chromium oxide-containing catalyst and containing an odor-producing antioxidant selected from the group consisting of phenols, bisphenols and aromatic amines and (2) in the range of 0.01 to 2.0 weight percent, based on the amount of said polymer, of an alpha-hydroxy ketone of the general formula RCHOHCOR', wherein R and R' are selected from the group consisting of alkyl, aryl, cycloalkyl, aralkyl and alkaryl radicals.

2. A polymer composition comprising a blend of (1) a polymer of an aliphatic 1-olefin having a maximum of 8 carbon atoms per molecule and no branching nearer the double bond than the 4-position, said polymer having been prepared in the presence of a chromium oxide-containing catalyst; (2) in the range of 0.001 to 1.0 weight percent, based on the amount of said polymer, of an odor-producing antioxidant compound selected from the group consisting of phenols, bisphenols and aromatic amines; and (3) in the range of 0.01 to 2.0 weight percent, based on the amount of said polymer, of an alpha-hydroxy ketone of the general formula RCHOHCOR', wherein R and R' are selected from the group consisting of alkyl, aryl, cycloalkyl, aralkyl and alkaryl radicals.

3. A polymer composition in accordance with claim 2 in which said antioxidant compound is 4,4'-thio-bis(6-tert-butyl-m-cresol) and said alpha-hydroxy ketone is benzoin.

4. A polymer composition in accordance with claim 2 in which said antioxidant compound is 4,4'-thio-bis(6-tert-butyl-m-cresol) and said alpha-hydroxy ketone is acetoin.

5. A polymer composition in accordance with claim 2 in which said 1-olefin is ethylene.

6. A method for inhibiting the development of odor in olefin polymers which comprises blending with a polymer of an aliphatic 1-olefin having a maximum of 8 carbon atoms per molecule and no branching nearer the double bond than the 4-position, said polymer having been prepared in the presence of a chromium oxide-containing catalyst and containing an odor-producing antioxidant selected from the group consisting of phenols, bisphenols and aromatic amines, in the range of 0.01 to 2.0 weight percent, based on the amount of said polymer, of an alpha-hydroxy ketone of the general formula

RCHOHCOR' wherein R and R' are selected from the group consisting of alkyl, aryl, cycloalkyl, aralkyl and alkaryl radicals.

7. A method for inhibiting the development of odor in olefin polymers which comprises blending with a polymer of an aliphatic 1-olefin having a maximum of 8 carbon atoms per molecule and no branching nearer the double bond than the 4-position, said polymer having been prepared in the presence of a chromium oxide-containing catalyst, the following materials: (1) in the range of 0.001 to 1 weight percent, based on the amount of said polymer, of an odor-producing antioxidant compound selected from the group consisting of phenols, bisphenols and aromatic amines, and (2) in the range of 0.001 to 2.0 weight percent, based on the amount of said polymer, of an alpha-hydroxy ketone of the general formula RCHOHCOR', wherein R and R' are selected from the group consisting of alkyl, aryl, cycloalkyl, aralkyl and alkaryl radicals.

8. The method in accordance with claim 7 in which said antioxidant compound is 4,4'-thio-bis(6-tert-butyl-m-cresol) and said alpha-hydroxy ketone is benzoin.

9. The method in accordance with claim 7 in which said antioxidant compound is 4,4'-thio-bis(6-tert-butyl-m-cresol) and said alpha-hydroxy ketone is acetoin.

10. The method in accordance with claim 7 in which said 1-olefin is ethylene.

References Cited in the file of this patent

UNITED STATES PATENTS

| 2,484,529 | Roedel | Oct. 11, 1949 |
| 2,820,775 | Chamberlain et al. | Jan. 21, 1958 |

FOREIGN PATENTS

| 201,160 | Australia | Apr. 28, 1955 |
| 1,155,667 | France | Dec. 2, 1957 |